United States Patent

Ohya

[11] Patent Number: 5,242,208
[45] Date of Patent: Sep. 7, 1993

[54] STRUCTURE OF A BODY OF AN AUTOMOTIVE VEHICLE

[75] Inventor: Takeji Ohya, Hiroshima, Japan

[73] Assignee: Mazda Motor Corporation, Hiroshima, Japan

[21] Appl. No.: 995,963

[22] Filed: Dec. 23, 1992

[30] Foreign Application Priority Data

Dec. 27, 1991 [JP] Japan .................. 3-360077
Dec. 27, 1991 [JP] Japan .................. 3-360078
Dec. 27, 1991 [JP] Japan .................. 3-360079

[51] Int. Cl.⁵ .................................. B60J 1/14
[52] U.S. Cl. ......................... 296/146.1; 296/201; 296/146.9
[58] Field of Search .......... 296/146 R, 146 A, 146 F, 296/201, 216; 49/501

[56] References Cited

U.S. PATENT DOCUMENTS

| | | | |
|---|---|---|---|
| 2,815,977 | 12/1957 | Podalan | 296/146 A |
| 2,973,221 | 2/1961 | Blackman | 296/146 A |
| 3,622,197 | 11/1971 | Vogelei | 296/146 A |
| 4,017,117 | 4/1977 | Eggert, Jr. | 296/146 F |

FOREIGN PATENT DOCUMENTS 62-43820 3/1987 Japan .

*Primary Examiner*—Robert R. Song
*Attorney, Agent, or Firm*—Fish & Richardson

[57] ABSTRACT

A body for an automotive vehicle is structured by a roof having roof openings, each extending over an entire length continuously to a side opening disposed at the side of the body. A lower portion of the side opening is closed or opened with a side door with no sash mounted thereto. On the other hand, the upper portion of the side opening and the roof opening are closed or opened with a window panel supported with the roof so as to pivot downwards and upwards.

38 Claims, 10 Drawing Sheets

STRUCTURE OF A BODY OF AN AUTOMOTIVE VEHICLE

BACKGROUND OF THE INVENTION

1. Field of the Invention

The present invention relates to the structure of a body of an automotive vehicle.

2. Description of the Related Art

As disclosed in Japanese Utility Model Laid-open Publication (kokai) No. 62-43,820, the body of an automotive vehicle is structured in such a manner that the roof is provided with a roof opening extending transversely outward, continuously to and integrally with a side opening. The roof opening is closed or opened with a lid member so disposed as to pivot downwards or upwards, and the side opening is closed or opened with a side door with a sash mounted thereto. This arrangement can provide an open feeling more than conventional canvas top cars, because the roof is made wide open when the lid member is opened.

Demands are still made, however, to enjoy a more open feeling during travelling. In order to satisfy such demands, one idea arises that the sash is removed from the side door.

The removal of the sashes from the side doors, however, may cause side glass window panels to vibrate during travelling due to a so-called suction phenomenon, and the problem with the sealing between the lid member for closing the roof opening and the side window glass panels may occur.

SUMMARY OF THE INVENTION

Therefore, the present invention has the object to provide an improvement in the structure of a body for an automotive vehicle so adapted as to offer a more open feeling without causing any problem with the sealing between a window panel and the edges of an open area which is to be covered with the window panel.

In order to achieve the aforesaid object, the present invention consists of the structure of a body for an automotive vehicle with a side opening formed above a side door at the side of the body and without a sash at an upper portion of the side door, wherein:

a roof is provided with a roof opening extending transversely outward, continuously to and integrally with the side opening;

a window panel is mounted to the roof so as to pivot in an upward or downward direction;

the window panel is in such a shape as fitting a shape of the roof opening and an upper portion of the side opening, extending upwards over the vertically entire length above an upper edge of the side door; and the roof opening and the upper portion of the side opening above the upper edge of the side door are opened or closed by an upwards or downwards pivotal movement of the window panel.

The arrangement for the structure of the body for the automotive vehicle as described hereinabove can provide a more open feeling because no sash is mounted to the side door and an opening area extending outwardly and continuously from the roof opening so as to be united integrally with the upper portion of the side opening above extending over the vertically entire length from the side door is covered with only one sheet of a window glass panel.

On the other hand, as the opening area is covered with only one sheet of the glass panel, the roof opening and the upper portion of the side opening can be sealed with a single sealing member yet they are not required to be sealed with a separate sealing member as in the conventional instance where the roof opening and the side opening are separate from each other. Thus, this arrangement can offer the advantage in terms of the sealing performance.

Further, preferably, the side door is provided with a bracket at its rear end portion so as to project upwards and the bracket is in turn provided with an outer door handle. This structure of the outer door handle does not require the driver to open or close the side door by bending itself because the outer door handle is raised to a higher position even if the upper position of the side door would be lowered. This arrangement for the structure of the body for the vehicle can provide a more open feeling by extending the top end portion of the window panel further downwards without requiring the driver to bend itself and perform operations for opening and closing the side door with its body bent forward.

Other objects, features and advantages of the present invention will become apparent during the course of the description of the preferred embodiments, which follows, with reference to the accompanying drawings.

DESCRIPTION OF THE PREFERRED EMBODIMENTS

The present invention will be described more in detail with reference to the accompanying drawings.

Figure 1:
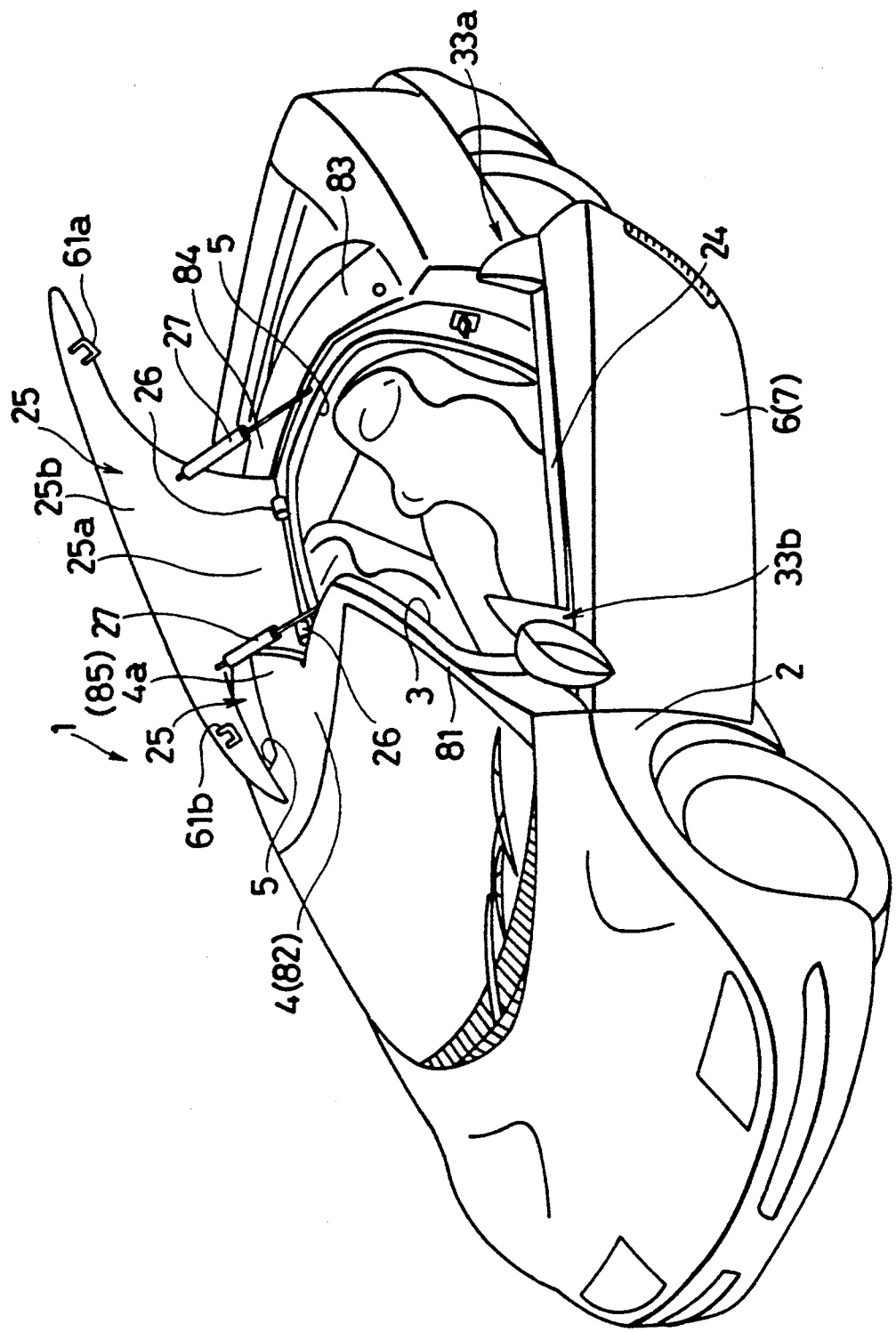
FIG. 1 is a perspective view showing the body of an automotive vehicle to which the structure of the door according to an embodiment of the present invention is applied.

As shown in FIG. 1, the body 1 of a vehicle is provided with a side opening 3 at each of sides 2 of the body 1, and a roof 4 of the body 1 is provided with a roof opening 5 at each of the sides of the roof 4 and with a middle roof section 4a at a middle portion of the roof 4, extending over the longitudinally entire length thereof. Each of the roof openings 5 is arranged so as to extend over the transversely entire length ranging from the respective side edge of the middle roof section 4a outward to the respective side of the body 1 and so as to be united integrally with the respective side opening 3.

The roof 4 mainly comprises a front header 82, a rear header 84, and a connecting middle section 85 (4a). The front header 82 of the roof 4 is disposed to connect the upper end portion of a left front pillar 81 to the upper end portion of a right front pillar 81, and the rear header 83 is disposed to connect the upper end portion of a left rear pillar 83 to the upper end portion of a right rear pillar 83. The connecting middle section 85 is disposed extending in the longitudinal direction of the roof 4 at its middle portion to thereby connect a transversely middle portion of the front header 82 to a transversely middle portion of the rear header 84. Each of the roof openings 5 is thus structured in such a manner that a front edge of the roof opening 5 is constituted by a rear edge of the front header 82, a rear edge of the roof opening 5 is constituted by a front edge of the rear header 84, an inner side edge of the roof opening 5 is constituted by the outer side edge of the connecting middle section 85, and an outer side edge of the roof opening is united integrally with an upper edge of the corresponding side opening 3.

To each of the sides 2 of the body 1 is mounted a side door 6 at the front end of the respective side opening 3 so as to pivot on its front edge outward and inward, thereby opening or closing each side opening 3 with the side door 6.

Figure 2:
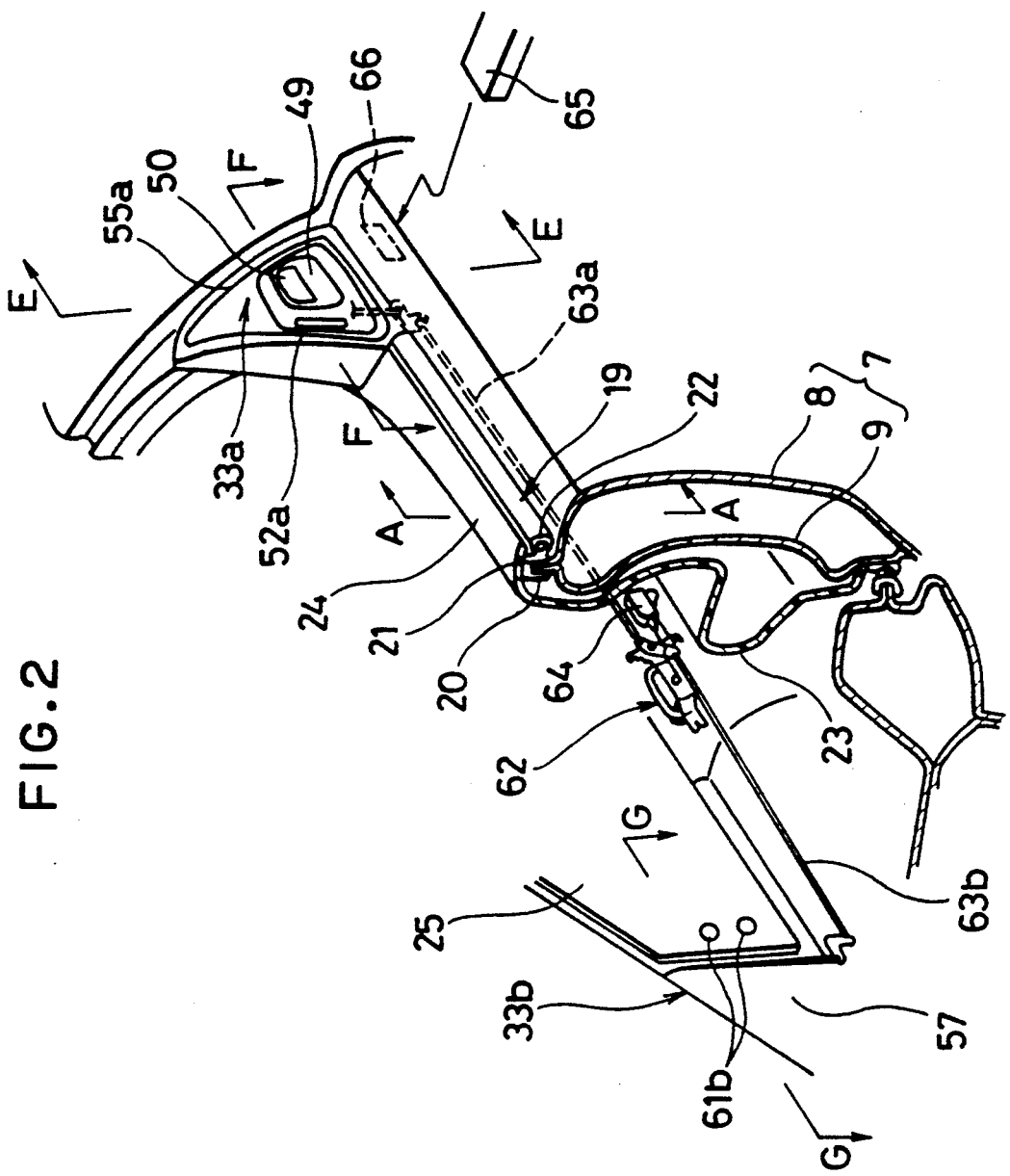
FIG. 2 is a partially enlarged, partially sectional view showing an essential portion of the structure according to the embodiment of the present invention.
Figure 3:
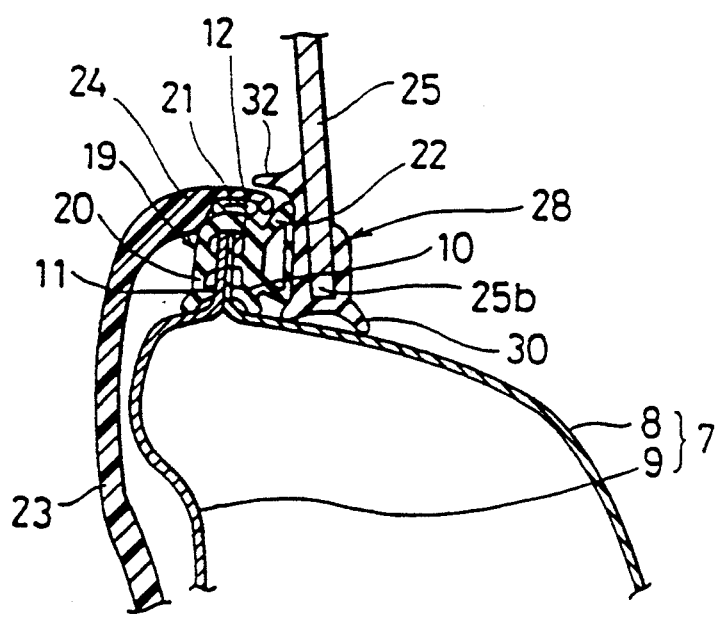
FIG. 3 is an enlarged view in section taken along line A—A of FIG. 2.

In the embodiment as shown in FIG. 1, the side door 6 constitutes a so-called "sashless" door. In other words, the lower portion of the side door 6 comprises a door panel 7, and the upper portion of the side door 6 is wide open upwards from an upper edge of the door panel 7 of the side door 6. The door panel 7 of the side door 6 is of such a double structure as formed together with an outer panel 8 and an inner panel 9, as shown in FIGS. 2 and 3. As specifically shown in FIG. 3, the outer panel 8 is provided with a flange section 10 at its upper end portion extending in the longitudinal direction of the side door 6 and the inner panel 9 is likewise provided with a flange section 11 at its upper end portion extending in the longitudinal direction of the side door 6. The flange section 10 of the outer panel 8 is secured to the flange section 11 of the inner panel 9 by welding or any other appropriate means, thereby forming a flange connection section 12. However, the connection between the flange sections 10 and 11 is discontinued at both of the side end portions of the side door 6 and they are disposed apart outward from each other, thereby forming a box-shaped opening portion 13 at the front side end portion of the flange connection section 12, as shown in FIG. 4, and with an box-shaped opening portion 14 at the rear side end portion thereof, as shown in FIG. 5.

Figure 4:
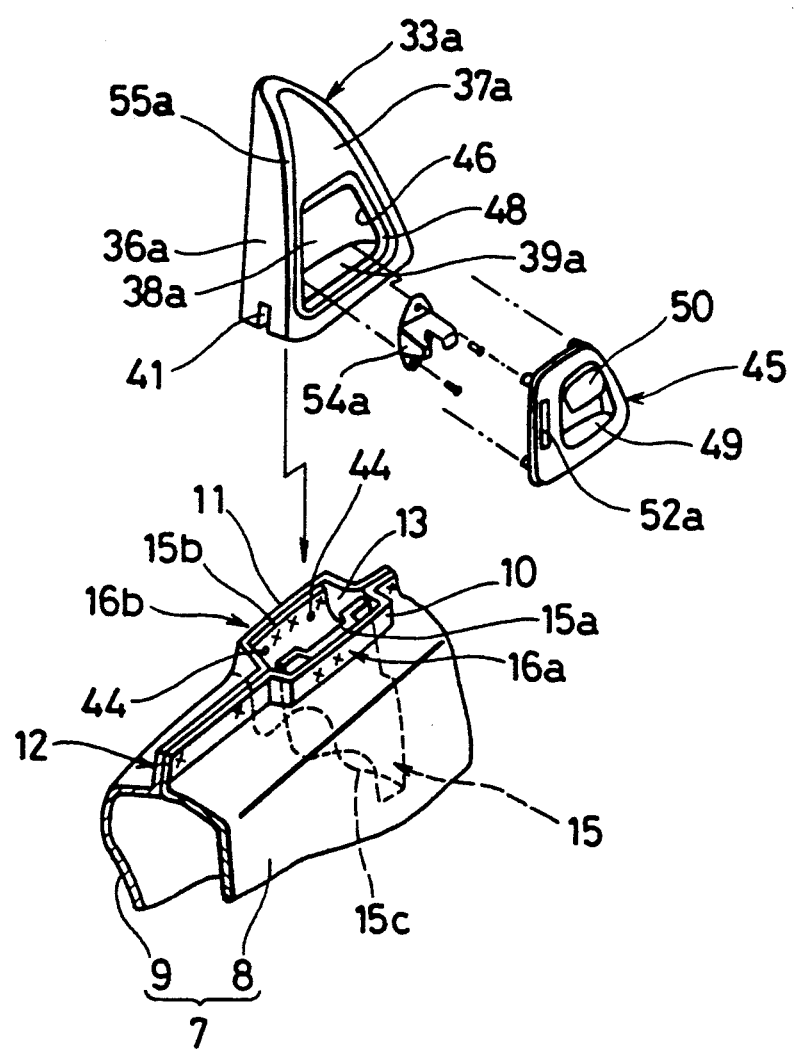
FIG. 4 is a partially exploded view showing the structure of a rear end portion of the side door.

As shown in FIG. 4, the box-shaped opening portion 13 is structured in such a manner that a door latch reinforcement member 15 extending in a vertical direction of the side door 6 is connected to the flange connection section 12 at its open portions. The door latch reinforcement member 15 is of a nearly square C-shaped form in section. More specifically, the door latch reinforcement member 15 comprises a pair of panel connection sections 15a, 15b and a connection section 15c, the panel connection sections 15a, 15b being disposed to face each other in the direction of thickness of the side door 6, and the connection section 15c being disposed so as to connect the rear portion of the panel connection section 15a with the corresponding rear portion of the panel connection section 15b. Further, the panel connection section 15a of the door latch reinforcement member 15 is secured to the flange section 10 of the outer panel 8 by welding or any other appropriate means, thereby forming a merged portion 16a and the panel connection section 15b is likewise secured to the flange section 11 of the inner panel 9 by welding or any other appropriate means, thereby forming a merged portion 16b.

In addition, in this embodiment, the connection section 15c of the door latch reinforcement member 15 is cut away at its upper portion, as indicated by the broken line in FIG. 4.

Figure 5:
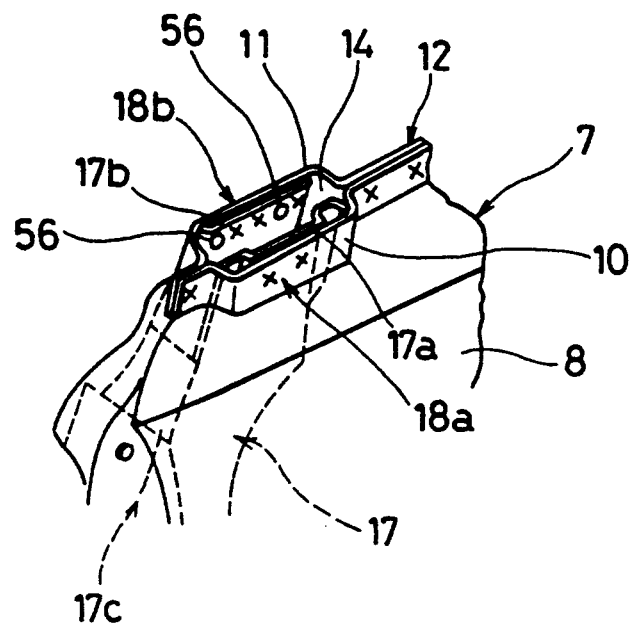
FIG. 5 is a perspective view showing the structure of a front end portion of the side door.

Likewise, as shown in FIG. 5, the box-shaped opening portion 14 is structured in such a manner that a door hinge reinforcement member 17 extending in a vertical direction of the side door 6 is connected to the flange connection section 12 at its open portions. The door hinge reinforcement member 17 is of a nearly square C-shaped form in section, as the door latch reinforcement member 15 is. More specifically, the door hinge reinforcement member 17 comprises a pair of panel connection sections 17a, 17b and a connection section 17c, the panel connection sections 17a, 17b being disposed to face each other in the direction of thickness of the side door 6, and the connection section 17c being disposed so as to connect the front portion of the panel connection section 17a with the corresponding front portion of the panel connection section 17b. Further, the panel connection section 17a of the door hinge reinforcement member 17 is secured to the flange section 10 of the outer panel 8 by welding or any other appropriate means, thereby forming a merged portion 18a and the panel connection section 18b is likewise secured to the flange section 11 of the inner panel 9 by welding or any other appropriate means, thereby forming a merged portion 18b.

In addition, in this embodiment, the connection section 17c of the door hinge reinforcement member 17 is cut away at its upper portion, as indicated by the broken line in FIG. 5.

As shown in FIGS. 2 and 3, the flange connection section 12 is provided with a weather strip 19 which comprises a mounting portion 20 and two sealing portions 21 and 22. The mounting portion 20 of the weather strip 19 is of an inverted U-shaped form in section, as specifically shown in FIG. 3, and it comprises a solid rubber and a metal core material built in the solid rubber. The mounting portion 20 is mounted to cover the flange connection section 12 from the above so as to fit an inner section of the U-shaped mounting portion 20 to the outer portion of the flange connection section 12. The sealing portion 21 is provided at the upper portion of the mounting portion 20, thereby functioning as sealing a gap formed between the sealing portion 21 and the inner side of a shelf section 24 of a door trim member 23. On the other hand, the sealing portion 22 is provided at the outer side of the mounting portion 20, thereby functioning as sealing a gap formed between the sealing portion 22 and a window panel 25. Each of the sealing portions 21 and 22 is made of a soft rubber material and it is of a hollow structure.

Referring back to FIG. 1, the window panel 25 is mounted to or supported with the corresponding middle roof section 4a so as to pivot upwards or downwards on its upper end portion 25a disposed next to the side edge of the middle roof section 4a. The window panel 25 is comprised of only one sheet of a glass panel so structured as to fit the shape of the roof opening 5 and an upper portion of the side opening 3 above the upper edge of the side door 6. More specifically, the window panel 25 is curved so as for its upper end portion 25a to fit the shape of the corresponding side edge of the middle roof section 4a and for its lower end portion 25b to fit the shape of the upper edge of the side door 6, when the window panel 25 is closed. Further, the window panel 25 is curved so as for its front and rear side edges to fit the shapes of the front and rear edges of the roof opening 5 and to fit the shapes of the upper front and rear edges of the side opening 3 corresponding to the upper portions above the side door 6, respectively, when the window panel 25 is closed. This structure of the window panel 25 can open and close the entire open area of the roof opening 5 and the upper half portion of the side opening 3 above the upper edge of the side door 6. When the window panel 25 is closed, the upper edge portion 25a of the window panel 25 is allowed to fit the sealing portion 22 of the weather strip 19 as shown in FIG. 3.

Further, the window panel 25 is supported at its upper end portion 25a from the inside with the middle roof section 4a through two hinge members 26 disposed at its front and rear end portions so as to allow the window panel to pivot upwards or downwards on its upper end portion 25a. The window panel 25 is additionally supported at its front end portion with a stay damper 27 disposed at the front edge portion of the roof opening 5 and at its rear end portion with another stay damper 27 disposed at the rear edge portion thereof. The window panel 25 is so arranged as to pivot upwards and downwards by stretching and contracting the stay dampers 27 by means of an entry system capable of an entry into the cabin of the vehicle without the use of a key, or an operating switch (not shown) disposed within the cabin of the body 1, thereby opening and closing the roof opening 5 and the side opening 3, respectively.

Each of the stay dampers 27 is provided with biasing force having such strength as capable of at least preventing the window panel 25 in an open state from moving downwards, for example, due to the weight of the window panel 25 itself or due to physical shocks. In this embodiment, the magnitude of the biasing force is so set as to cause the window panel 25 to move upwards from its closed state slowly and as long as no external force is provided for the window panel 25 and as not to move the window panel 25 to move downwards from its open state as long as no external force is applied.

As shown in FIGS. 3, 10, 11, and 13, the window panel 25 is provided over the entire length at its external edge portion with a modular molding 28 that is so arranged as to vary its shape in section in accordance with the position of the window panel 25. The modular molding 28 has three lip sections 29, 30 and 32.

Figure 6:
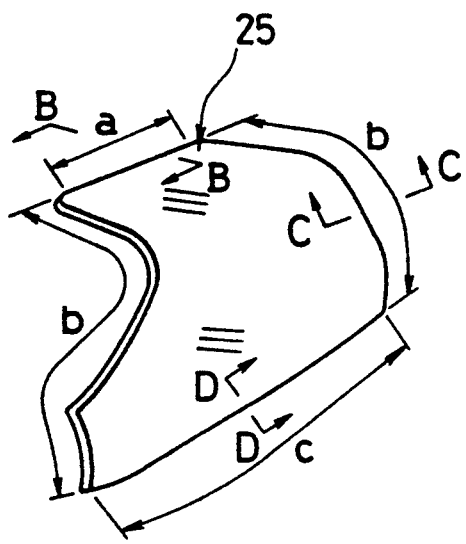
FIG. 6 is a perspective view showing a region at which a modular molding is mounted to an outer circumferential edge portion of the window panel.
Figure 7:
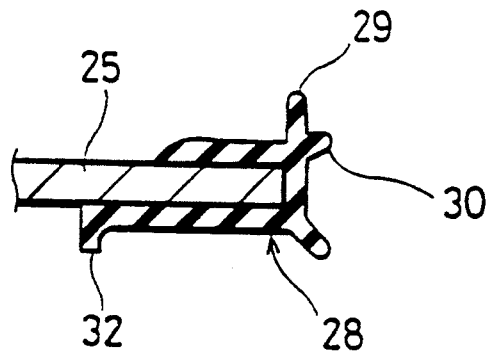
FIG. 7 is an enlarged view in section taken along the line B—B of FIG. 6.

More specifically, the window panel 25 is provided at its upper end portion 25a, as indicated by reference symbol "a" in FIG. 6, with the modular molding 28 as shown in FIG. 7, wherein the lip section 29 is disposed so as to cause rain water existing on the external surface of the window panel 25 to rapidly flow into a rain rail section and so as to prevent the rain water from entering into the cabin of the body 1, when the window panel 25 is opened or closed.

Figure 8:
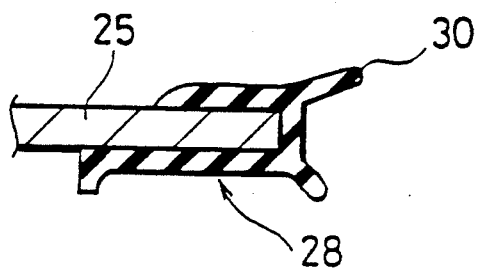
FIG. 8 is an enlarged view in section taken along the line C—C of FIG. 6.

Further, the window panel 25 is provided at its front and rear side edge portions, as indicated by reference symbol "b", with the modular molding 28 as shown in FIG. 8, wherein the lip section 30 is extended in a length longer than the lip portion 30 provided for the upper and lower edge portions of the window panel 25. The disposition of the longer lip section 30 serves as improving the sealing performance against an outer pillar member 31 and a front corner bracket 33b, as will be described hereinafter.

Figure 9:
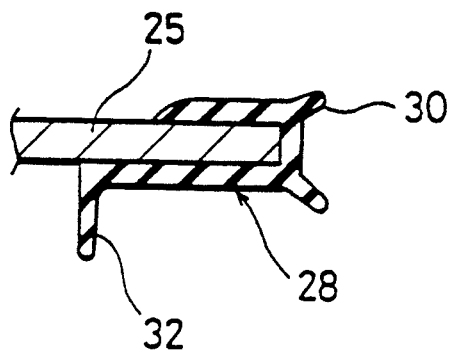
FIG. 9 is an enlarged view in section taken along the line D—D of FIG. 6.

In addition, the window panel 25 is provided at its lower end portion 25b, as indicated by reference symbol "c", with the modular molding-28 as shown in FIG. 9, which has the lip section 32 extended to a length longer than the lip sections 32 provided for the upper edge portion 25a and the side edge portions of the window panel 25. The arrangement for the longer lip section 32 allows the lower edge portion 25b to cover the upper edge portion of the door trim member 23 from the outside of the body 1, when the window panel 25 is closed.

Referring back to FIG. 1, the door panel 7 is provided with a rear corner bracket 33a and a front corner bracket 33b at its rear and front side of the side door 6, respectively. The outer side of the rear corner bracket 33a is arranged to project upwards at the upper rear end corner of the door panel 7. Further, the entire area of the outer side of the rear corner bracket 33a is covered with the window panel 25 when the window panel 25 is closed.

Figure 10:
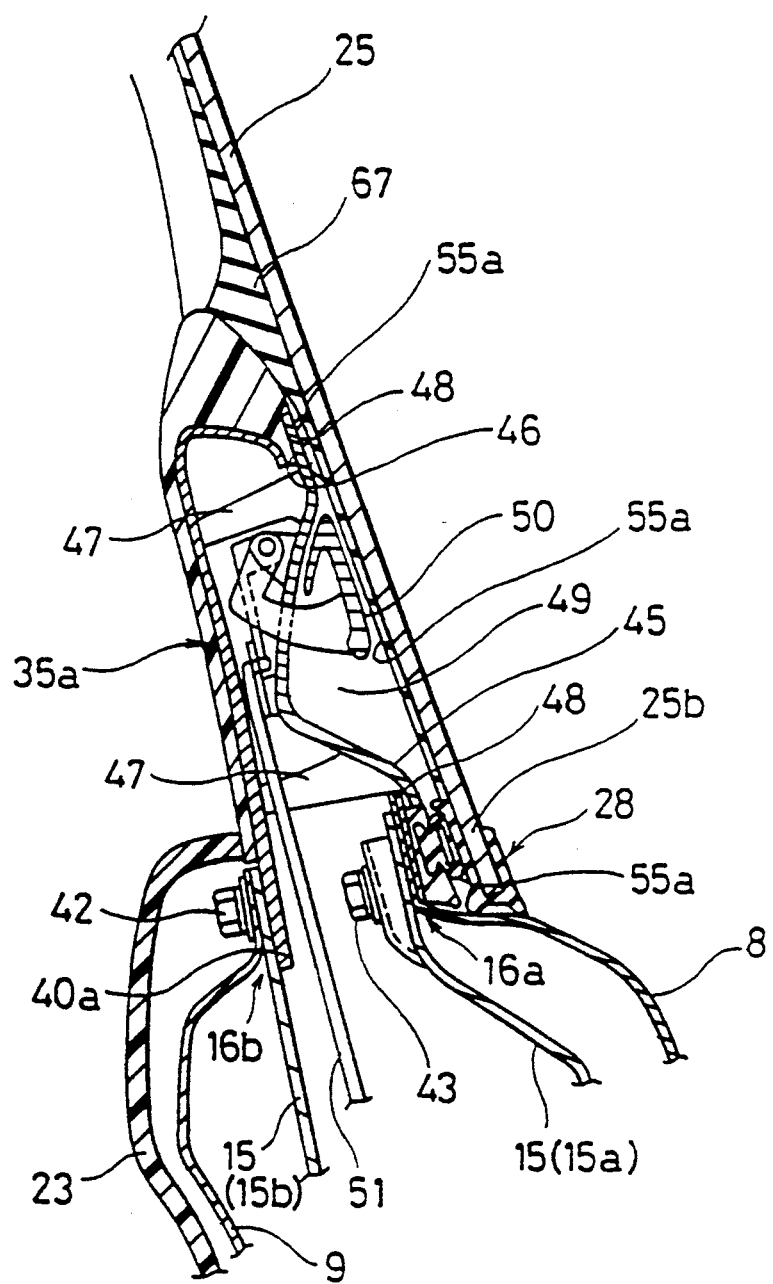
FIG. 10 is an enlarged view in section taken along the line E—E of FIG. 2.
Figure 11:
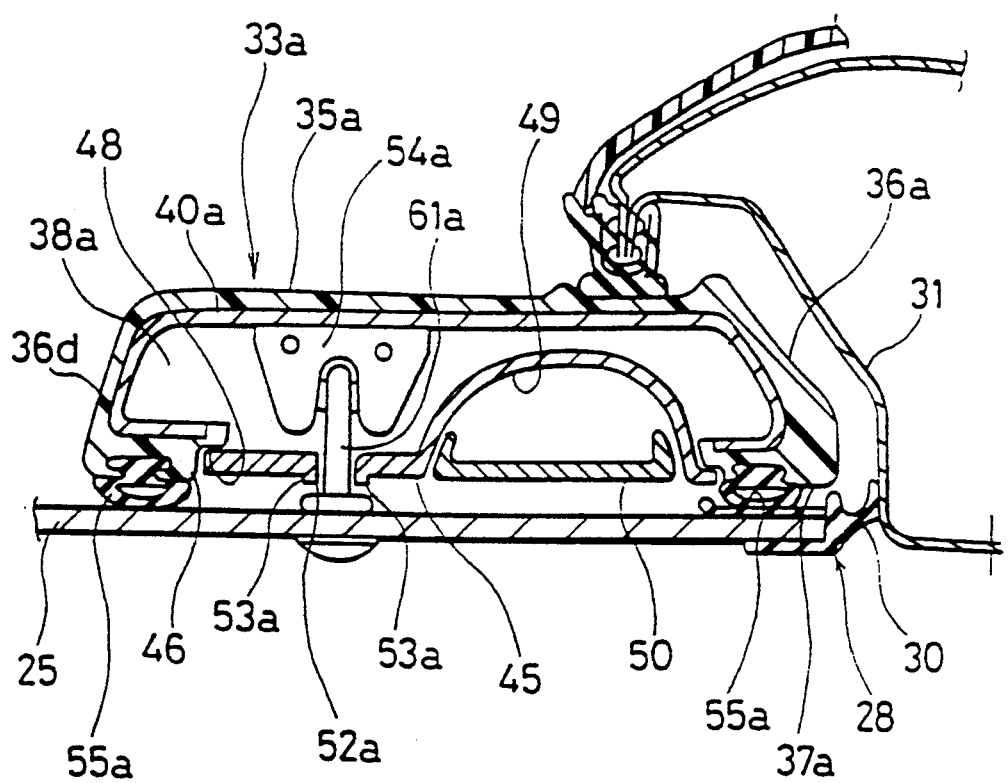
FIG. 11 is an enlarged view in section taken along the line F—F of FIG. 2.

As shown in FIGS. 4, 10, and 11, the rear corner bracket 33a comprises a rear surface section 35a constituting the inner side of the rear corner bracket 33a, a side surface section 36a constituting each of the front and rear sides thereof, and a front surface section 37c constituting the outer side thereof. The side surface section 36b of the rear corner bracket 33a is disposed so as to extend from the corresponding side edge of the rear surface section 35a outwardly in the direction of thickness of the door panel 7. The front surface section 37a is disposed to connect one of the side surface sections 36a at its outer side edge with the other side surface sections 36a at its other outer side edge. Thus, this arrangement provides the inside of the rear corner bracket 33a with an inner space 38a, i.e. the rear corner bracket 33a is of a generally horn-like hollow structure and of a triangular shape in vertical section. The rear corner bracket 33a is further provided at its bottom with an opening 39a so as to fit the shape of the inner space 38a and to be communicated with the inner space 38a. Further, to the inner surface of the rear corner bracket 33a is integrally mounted a core member 40a, thereby strengthening the rigidity of the rear corner bracket 33a. The rear surface section 35a is disposed to be shorter than the front surface section and only the core member 40a is disposed extending downwards. Furthermore, in this embodiment, each of the side surface sections 36a is provided at its lower side with an engaging groove 41 which is allowed to be engaged with the flange connection section 12, as shown in FIG. 4. By inserting the flange connection section 12 into the engaging grooves 41 of the rear corner bracket 33a disposed on both of the longitudinal sides of the opening 13, the rear corner bracket 33a is engaged with the flange connection section 12.

In the opening 13, the rear surface section 35a of the rear corner bracket 33a is fixed to the merged portion 16b with bolts 42 through an extension section of the core member 40a, and the front surface section 37a of the rear corner bracket 33a is fixed to the merged portion 16a with bolts 43. In FIG. 44, reference numeral 44 denotes an insert hole for the bolt 42.

Further, as shown in FIGS. 4, 10, and 11, the rear corner bracket 33a is provided with a door handle base 45 that is so arranged as to become part of the front surface section 37a of the rear corner bracket 33a and to cover an opening 46 formed at the front surface section 47a from the outside of the body. The door handle base 45 is fixed to the inner surface of the rear surface section 35 of the rear corner bracket 33a through a plurality of boss sections 47 provided on the inner surface of the door handle base 45. Specifically, in this embodiment, the front surface section 48 is provided at a peripheral section of the opening 46 with a step section 48 so as to abut with the door handle base 45, thereby allowing the plane of the outer surface of the door handle base 45 to be disposed in straight line with the plane of the front surface section 37a of the rear corner bracket 33a.

The door handle base 45 is provided with a concave section 49 and an outer door handle 50 is mounted at the concave section 49 in such a manner that is supported with the door handle base 45 so as to allow an outer surface of the outer door handle 50 to be disposed on the straight plane with the outer surface of the door handle base 45. Further, the outer door handle 50 is associated with a door opening-closing mechanism (not shown) through a push rod 51, as is known to the art.

In addition, as shown in FIGS. 2, 4, and 11, the door handle base 45 is provided with a striker entry hole for allowing a striker to be inserted therethrough in the position next to the concave section 49. In this embodiment, the striker entry section 52a is in the form of a vertically extending slit. The striker entry section 52a is provided at its circumferential portion with a rib 53a which projects therefrom, as shown in FIG. 11. The rib 53a serves as preventing rain drops adhering to the front surface section 37a of the rear corner bracket 33a from entering through the striker entry section 52a when the window panel 25 is opened.

As shown in FIGS. 4 and 11, the rear corner bracket 33a is provided with a latch 54a for the window panel as an engaging member so as to correspond to the striker entry section 52. The latch 54a is fixed to the inner surface of the rear surface section 35a of the rear corner bracket 33a, and the engaged portion of the latch 54a is disposed so as to face the striker entry section 52a.

As shown in FIGS. 2, 4, 10, and 11, the front surface section 37a of the rear corner bracket 33a has a weather strip 55a disposed as a sealing member at an outer circumferential edge portion thereof, and the door handle base 45 is disposed on the weather strip 55a. This arrangement allows the weather strip 55a to abut with the window panel 25 when the window panel 25 is closed, thereby offering the sealing function and preventing rain water from entering through the striker entry section 52a and the outer door handle 50.

Figure 12:
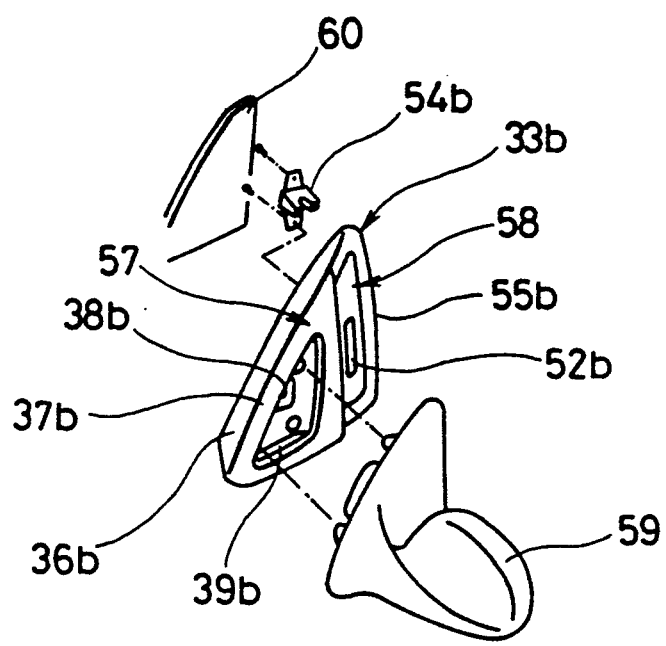
FIG. 12 is an exploded, perspective view showing the front corner bracket and the door mirror.
Figure 13:
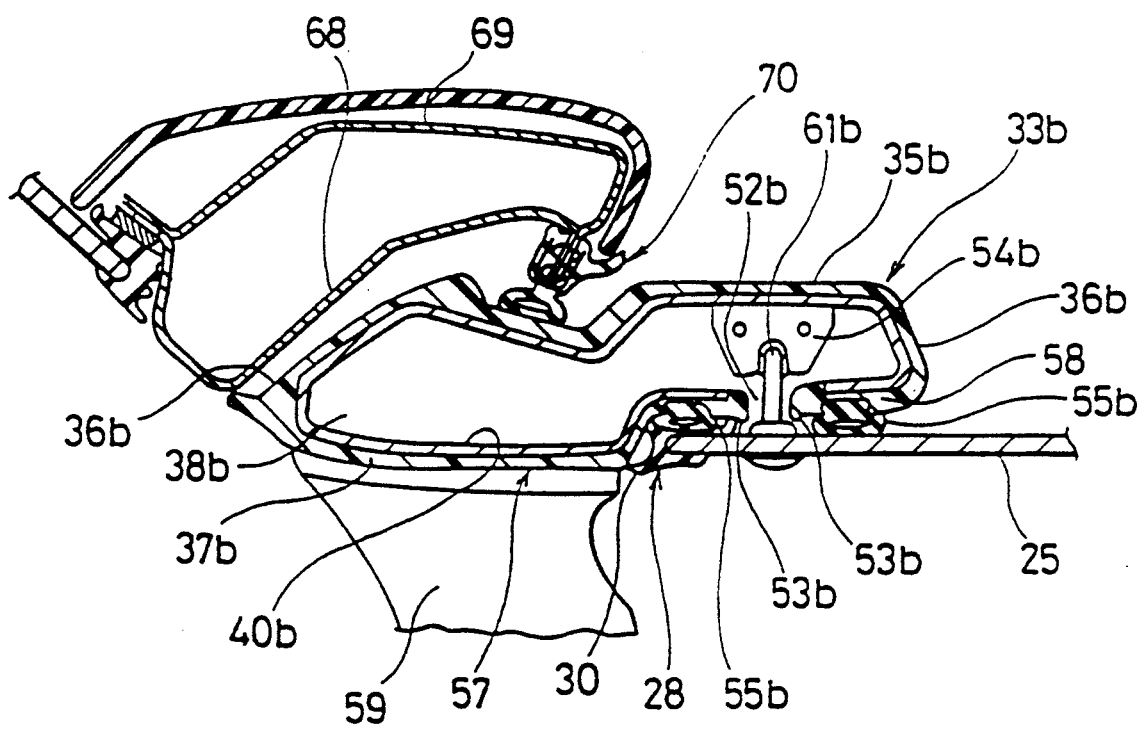
FIG. 13 is an enlarged, sectional view taken along the line G—G of FIG. 2.

On the other hand, as shown in FIGS. 1 and 2, the front corner bracket 33b is disposed so as to project upwards from the upper front corner at the front side of the side door 6 and it comprises a rear surface section 35b, a pair of side surface sections 36b, and a rear surface section 37b, as shown in FIGS. 12 and 13, like the rear corner bracket 33a. The front corner bracket 33b is of such a hollow structure as having an inner opening 38b and a lower opening 39b enclosed with the rear surface section 35b, the side surface sections 36b, and the front surface section 37b. To an inner surface of the front corner bracket 33b is integrally mounted a core member 40b, thereby strengthening the rigidity of the front corner bracket 33b. The front corner bracket 33b is mounted in substantially the same manner as the rear corner bracket 33a, by fixing the rear surface section 35b to the merged portion 18b through an extension of the core member 40b and fixing the front surface section 37b to the merged portion 18a, as shown in FIG. 5. In FIG. 5, reference numeral 56 denotes a bolt insert hole through which the bolt is fastened to fix the front corner bracket 33b.

As shown in FIGS. 12 and 13, the front corner bracket 33b comprises a front side end section 57 and a rear side end section 58, and only the rear side end section 58 is disposed facing the inner surface of the window panel 25 when the side door 6 and the window panel 25 are closed. The front side end section 57 is so arranged as to mount a door mirror 59 to the front surface section 37b. As shown specifically in FIG. 13, the rear side end section 58 is so arranged as to stand back from the front side end section 57 in a depth longer to some extent than the thickness of the window panel 25.

The rear side end section 58 of the front corner bracket 33b is provided at its front surface section 37b with a weather strip 55b as a sealing member and with a striker entry section 52b as well.

The weather strip 55b is disposed so as to project from an outer circumferential edge section of the rear side end section 58 and arranged so as to come into abutment with the window panel 25 when the window panel 25 is closed, thereby offering improvements in the sealing function.

The striker entry section 52b is disposed within the circumference of the weather strip 55b and it is of a vertically extending slit, like the striker entry section 52a, with a rib 53b disposed at its circumference section in a projecting manner.

As shown in FIG. 12, a latch 54b for the window panel 25 is provided on the front corner bracket 33b so as to correspond to the striker entry section 52b. The latch 54b is mounted to the inner surface of the rear surface section 35b of the front corner bracket 33b through bolts or the like in such a manner that an engaged section of the latch 54b faces the striker entry section 52b. The bolts or other mountings are screwed or inserted from the inside of the cabin of the body and they are covered with an inner garnish 60, as shown in FIG. 12.

As shown in FIGS. 1, 11, and 13, the inner surface of the window panel 25 is provided with a pair of strikers 61a and 61b at its lower front and rear end sections on the front side of the vehicle so as to be engaged with the latches 54a and 54b, respectively. More specifically, the striker 61a is allowed to enter into the striker entry section 52a of the rear corner bracket 33a and to be engaged with the latch 54a, on the one hand, and the striker 61b is allowed to enter into the striker entry section 52b of the front corner bracket 33b and to be engaged with the latch 54b, on the other hand. In this case, the lower front end section of the window panel 25 is allowed to come into abutment with the weather strip 55b provided on the rear side end section 58 of the front corner bracket 33b; however, the surface of the front side end section 57 is not on the straight plane with the surface of the window panel 25 when the side door 6 is closed.

Further, as shown in FIG. 2, the side door 6 is provided at its inner side with an inner door handle 62 which in turn is associated with a door latch in such a manner as is known to the art and it is further associated with the latches 54a and 54b through inner rods 63a and 63b, respectively. This arrangement allows the side door 6 to be opened with the inner door handle 62 and, at the same time, the relationship of the engagement of the strikers 61a and 61b of the window panel 25 with the respective latches 54a and 54b to be released.

On the other hand, the entry system requiring no key for the entry into the cabin of the vehicle is adopted for allowing the engagement of the strikers 61a and 61b of the window panel 25 with the respective latches 54a and 54b and for the disengagement of the strikers 61a and 61b thereof from the respective latches 54a and 54b to be made from the outside of the body. At this end, as shown in FIG. 2, an actuator 64 is associated with the inner rods 63a and 63b and arranged so as to be operated on the basis of an instruction from a receiver section 66 for receiving a signal from a transmitter 65 disposed outside of the body. It is to be noted as a matter of course that the side door 6 is so arranged as to be opened simultaneously.

As shown in FIG. 10, in this embodiment, the modular molding 28 is provided with a projection section 67, thereby enlarging the back pressure of the projection 67 when the window panel 25 is being closed and, as a result, improving the sealing performance between the projection 67 and the rear corner bracket 33a.

Further, in this embodiment, as shown in FIG. 13, a weather strip 70 is mounted to a connection section in which an outer front pillar 68 is connected with an inner front pillar 69. In this case, a sealing portion of the weather strip 70 is arranged so as to become perpendicular to the rear surface section 35b of the front corner bracket 33b in the direction in which the side door 6 is opened and closed. This arrangement can prevent the weather strip 70 from turning over when the side door 6 is opened and closed, thereby strengthening and improving the sealing performance.

With the arrangement for the structure of the roof opening 5 and the side opening 3 in association with the side door 6, the open area above the side door 6 can be opened and closed with only one sheet of the window panel 25 and no sash is provided for the side door 6, so that the structure of the door for the body according to the present invention can offer an open feeling more than the structure of the door with a sash, when the window panel 25 is opened.

Further, it is to be noted that no attention is required to be paid to the sealing between the roof opening 5 and the side opening 3 and to the protection of each of the roof opening 5 and the side opening 3 with a single member from leaking rain water or the like, because the open area extending from the roof opening 5 to the upper portion of the side opening 3 above the upper edge of the side door 6 is covered with a single sheet of the window panel 25.

In addition, in this embodiment, the upper edge portion 25a of the window panel 25 is supported with the middle roof section 4a through the two hinge members 26, and the window panel 25 is locked with the latches 54a and 54b of the rear corner bracket 33a and the front corner bracket 33b through the strikers 61a and 61b formed on the inner surface of the window panel 25, respectively; hence, the window panel 25 is supported in a secured manner and prevented from vibrating due to a so-called suction phenomenon, even if no sash is provided for the side door 6. Thus, no new problem may be caused to occur in terms of the sealing between the lower edge portion 25b of the window panel 25 and the side door 6.

Furthermore, as described hereinabove, the upper edge portion 25a of the window panel 25 is supported with the middle roof section 4a through the two hinge members 26, and the window panel 25 is additionally supported with the latches 54a and 54b of the rear corner bracket 33a and the front corner bracket 33b through the strikers 61a and 61b formed on the inner surface of the window panel 25, respectively; thus, the window panel 25 is supported at its four corners in a secured manner so that the performance of supporting the window panel 25 is improved.

On the other hand, when the window panel 25 is to be opened, the engagement of the latches 54a and 54b with the respective strikers 61a and 61b can be released on the basis of the entry system allowing the entry into the cabin of the body from the outside of the body without the use of the key and on the basis of the association of the inner door handle 62 with the inner rods 63a and 63b from the inside of the body. Hence, even if two pairs of the latches 54a and 54b as well as the strikers 61a and 61b are provided, it is not required to operate each of them separately.

Further, in this case, as the inner door handle 62 is utilized for opening the window panel 25 from the inside of the cabin of the body, the disengagement of the side door 6 can be performed simultaneously, thereby causing the operability not to be decreased.

In addition, as the latches 54a and 54b are provided for the rear corner bracket 33a and the front corner bracket 33b and the strikers 61a and 61b are provided for the window panel 25, no releasing mechanism such as an operating rod or the like is required as in the instance where the latches are provided for the window panel, thereby enlarging a visible area through the window panel 25.

Furthermore, a more open feeling can be attained by extending the lower edge portion 25b of the window panel 25 and lowering the upper edge portion of the door panel 7 of the side door 6 to thereby increase the area of the window panel 25, corresponding to the open area located above the upper edge of the side door 6. In this case, the rear corner bracket 33a and the front corner bracket 33b are disposed so as to project upwards from the door panel 7 and the rear corner bracket 33a or the front corner bracket 33b may be provided with an outer door handle 50, so that the driver may not necessarily bend itself forwards before the door handle base 45 when the key is to be inserted into a key cylinder mounted to the door handle base 45 and the side door 6 is to be opened or closed.

In addition, as the outer door handle 50 is covered with the window panel 25 when the window panel 25 is closed, this arrangement can prevent the outer door handle 50 from being exposed to rain water and a third party from illegally opening the side door 6, for example, for thief purposes or due to mischief.

On the other hand, the rear corner bracket 33a is provided with the latch 54a for the engagement with the window panel 25 and the door handle base 45 to be disposed facing the latch 54a is formed with the striker entry section 52a, on the one hand, and the front corner bracket 33b is provided with the latch 54b for the engagement with the window panel 25 and the front surface section 37b of the front corner bracket 34b formed with the striker entry section 52b so as to face the latch 54b, on the other hand; hence, it is not required to arrange for the latches 54a and 54b to be disposed in such a manner as projecting outward, thereby improving an outlook of the side door 6.

Further, as the latches 54a and 54b are disposed at the side of the side door 6, a mechanism for releasing the latch, such as an operating rod or the like, can be disposed within the side door 6, thereby improving an outlook of the side door.

As described hereinabove, the structure of the door for the vehicle according to the present invention is further arranged in such a manner that the ribs 53a and 53b are formed at the circumference of the strikers 52a and 52b and the weather strips 55a and 55b are mounted at the outer circumference sections of the rear corner bracket 33a and the front corner bracket 33b, respectively; hence, rain water and so on can be prevented for sure from leaking into the rear corner bracket 33a and the front corner bracket 33b.

Further, as described hereinabove, as the rear corner bracket 33a is fixed to the highly rigid merged portions 16a and 16b and the front corner bracket 33b is fixed to the highly rigid merged portions 18a and 18b, the rigidity for supporting the rear corner bracket 33a and the front corner bracket 33b can be improved to a greater extent.

In addition, each of the door latch reinforcement member 15 and the door hinge reinforcement member 17 is of a square C-shaped structure in section and each of the end sections of the door latch reinforcement member 15 and the door hinge reinforcement member 17 is joined to the flange section 10 of the outer panel 8 and to the flange section 11 of the inner panel 9; hence, the stress imposed upon the door latches, the door hinges, and so on can be dispersed.

Further, the rear side end section 58 at the front surface section 37a of the front corner bracket 33b is so disposed as to stand back from the front side end section 57, whereby the outer surface of the window panel 25 is so arranged as to become on the straight plane with the front surface section 37a at the front side end section 57.

It should further be understood that the following embodiments are encompassed within the scope of the present invention.

It is feasible that either one of the front corner bracket 33b or the rear corner bracket 33a is provided or three or more corner brackets may be provided and that the window panel 26 is fixed to the middle roof section with one hinge member or with three or more hinge members.

It should be understood herein that the foregoing text and description be interpreted to be not limitative in any respect, but to be illustrative, and any modifications, variants and changes which do not depart from the scope of the invention should be interpreted to be encompassed within the spirit and scope of the present invention.

What is claimed is:

1. A structure of a body for an automotive vehicle with a side opening formed above a side door at the side of a body of the vehicle and without a sash at an upper portion of said side door, wherein:
    a roof is provided with a roof opening extending transversely outward, continuously to and integrally with said side opening;
    a window panel is mounted to the roof so as to pivot in an upward or downward direction;
    said window panel is in such a shape as fitting a shape of said roof opening and an upper portion of said side opening, extending upwards over the vertically entire length above an upper edge of said side door; and
    said roof opening and the upper portion of said side opening above the upper edge of said side door are opened or closed by a downwards pivotal movement of said window panel.

2. A structure of a body for an automotive vehicle as claimed in claim 1, wherein:
    a pair of said side openings are disposed at both left and right sides of the body;
    a pair of said roof openings are disposed at both left and right sides of said roof; and
    a pair of said window panels are mounted at both left and right sides of said roof.

3. A structure of a body for an automotive vehicle as claimed in claim 2, wherein said roof comprises:
    a front header connecting an upper end portion of a left front pillar to an upper end portion of a right front pillar;
    a rear header connecting an upper end portion of a left rear pillar to an upper end portion of a right rear pillar; and
    a middle roof section interposed with the pair of said roof openings and extending in a longitudinal direction of the body for connecting a transversely middle portion of said front header to a transversely middle portion of said rear header.

4. A structure of a body for an automotive vehicle as claimed in claim 3, wherein each of said left window panel and said right window panel is mounted at its upper edge to said middle roof section.

5. A structure of a body for an automotive vehicle as claimed in claim 2, wherein each of the pair of said window panels is mounted at a side end portion of said middle roof section with at least two hinge members, said hinge members being disposed in a spaced relationship in a longitudinal direction of the body.

6. A structure of a door for an automotive vehicle as claimed in claim 2, wherein the pair of said side doors comprise only a side door disposed at the left side of the body and a side door disposed at the right side thereof.

7. A structure of a body for an automotive vehicle as claimed in claim 1, wherein said window panel comprises one sheet of a glass panel formed in a curved manner so as to fit the roof opening and the upper portion of the side opening above the upper edge of the side door, said glass panel comprising a side window panel section for closing said side opening and a roof window panel section for closing said roof opening, said roof window panel section and said side window panel section being continuously integral with each other without any seam at a boundary between the side window section and the roof window section.

8. A structure of a body for an automotive vehicle as claimed in claim 1, wherein a sealing member is disposed over an entire length of an outer circumferential section of the window panel for sealing a gap to be formed between the window panel in a closed state and the body.

9. A structure of a body for an automotive vehicle as claimed in claim 1, wherein a lower edge portion of said window panel in a closed state so arranged as to cover an upper edge portion of said side door in a closed state from the outside of the body and an operation for opening said side door is allowed to be made in condition that said window panel is open at least to some extent.

10. A structure of a body for an automotive vehicle as claimed in claim 1, wherein means for supporting said window panel in a closed position is disposed between said window panel and said side door.

11. A structure of a body for an automotive vehicle as claimed in claim 10, wherein a damper is provided for operating said window panel in an opening direction when said means for supporting said window panel is released.

12. A structure of a body for an automotive vehicle as claimed in claim 10, wherein said means for supporting said window panel is released in association with an operation of an inner door handle disposed at the inner side of said side door on the side of a cabin of the body.

13. A structure of a body for an automotive vehicle as claimed in claim 10, wherein an outer door handle disposed at the outer side of said side door is covered with said window panel in a closed state from the outside of the body.

14. A structure of a body for an automotive vehicle as claimed in claim 13, wherein said means for supporting said window panel is released by means of an entry system using a radio communication means.

15. A structure of a body for an automotive vehicle as claimed in claim 13, wherein:
said means for supporting said window panel is released in association with an operation of an inner door handle disposed at the inner side of said side door on the side of the cabin of the body;
said means for supporting said window panel in a closed position is released by an entry system requiring no key for opening said side door; or
said damper is provided for operating said window panel in an opening direction when said means for supporting said window panel is released.

16. A structure of a body for an automotive vehicle as claimed in claim 10, wherein:
said side door is provided at each of its upper front and rear end sections with a bracket projecting upwards therefrom; and
said means for supporting the window panel is interposed between each of said brackets and said window panel.

17. A structure of a body for an automotive vehicle as claimed in claim 16, wherein said means for supporting the window panel comprises a latch disposed at each of said brackets and a striker disposed at each of the front and rear side of the window panel so as to be engaged with said latch.

18. A structure of a body for an automotive vehicle as claimed in claim 16, wherein said window panel is pivotally mounted to the body through at least two hinge members disposed at a spaced relationship in a longitudinal direction of the body.

19. A structure of a body for an automotive vehicle as claimed in claim 17, wherein a portion of each of said brackets at least in the vicinity of a position in which said latch is mounted is so arranged as to be covered from the outside of the body with said window panel in a closed state.

20. A structure of a body for an automotive vehicle as claimed in claim 1, wherein:
a rear bracket is mounted to a rear end portion of said side door, or at a side end portion opposite to a position in which the side door is mounted to the body, so as to project upwards; and
said rear bracket is provided with an outer door handle for opening and closing said side door.

21. A structure of a body for an automotive vehicle as claimed in claim 20, wherein said outer door handle is so mounted as to be covered from the outside of the body with said window panel in the closed state.

22. A structure of a body for an automotive vehicle as claimed in claim 21, wherein:
said rear bracket is provided with a door handle base so as to cover said rear bracket from the outside of the body;
said door handle base is provided with said outer door handle;
said rear bracket is provided with a latch; and
said window panel is provided with a striker so as to be inserted through a striker entry section and to be engaged with said latch.

23. A structure of a body for an automotive vehicle as claimed in claim 22, wherein said striker entry section is provided at its circumference with means for preventing rain water from entering from the outside of the body.

24. A structure of a body for an automotive vehicle as claimed in claim 23, wherein said means for preventing rain water comprises a rib disposed at an entire length of a circumference of said striker entry section so as to project toward the outside of the body.

25. A structure of a body for an automotive vehicle as claimed in claim 22, wherein said bracket is provided at an entire length of its outer circumferential edge section with a sealing member for sealing a gap formed between said rear bracket and said window panel in a closed state.

26. A structure of a body for an automotive vehicle as claimed in claim 20, wherein:
said side door is of a double structure formed with a door panel comprising an inner panel and an outer panel; and
a portion of said door panel at which said rear bracket is mounted is reinforced with a reinforcement member.

27. A structure of a body for an automotive vehicle as claimed in claim 26, wherein said rear bracket is fixed to a merged section at which said reinforcement member is secured to said door panel.

28. A structure of a body for an automotive vehicle as claimed in claim 27, wherein:
said inner panel and said outer panel are each provided with an upper flange section at which said inner panel and said outer panel are attached to each other; and
said reinforcement member is joined each to said upper flange section for said inner panel and for said outer panel.

29. A structure of a body for an automotive vehicle as claimed in claim 28, wherein:
said flange section for the inner panel is disposed in a relationship spaced apart in a direction of thickness of the side door from said flange section for the outer panel in a position in which said rear bracket is mounted, said position being provided with a mounting section opening upwards;
said rear bracket is fixed to said mounting section; and
said reinforcement member is in a sectional shape having a pair of joint sections and a connection section, said joint section each being attached to the flange section of said mounting section at least for both of said inner panel and said outer panel, and said connection section connecting said joint sections to each other in a direction of thickness of the side door.

30. A structure of a body for an automotive vehicle as claimed in claim 1, wherein:
   a front bracket is arranged so as to project upwards and disposed at a front end section of said side door, or at an end section of said side door at which said side door is mounted to the body;
   said window panel is arranged so as to cover only a rear end portion of said front bracket from the outside of the body, when said window panel is closed; and
   said rear end portion of said front bracket is so arranged as to stand back toward the inside of the body in a predetermined depth from a front end portion of said front bracket.

31. A structure of a body for an automotive vehicle as claimed in claim 30, wherein:
   said front bracket is provided at its inner rear end portion with a latch;
   said front bracket is provided at its rear end portion with a striker entry section opening toward the outside of the body; and
   said window panel is provided with a striker so arranged as to insert through said striker entry section and to be engaged with said latch.

32. A structure of a body for an automotive vehicle as claimed in claim 31, wherein said striker entry section is provided at its circumference with means for preventing rain water from entering into said striker entry section from the outside of the body.

33. A structure of a body for an automotive vehicle as claimed in claim 32, wherein said means for preventing rain water from entering into said striker entry section from the outside of the body is provided with a rib projecting toward the outside of the body over an entire length of the circumferential edge section of said striker entry section.

34. A structure of a body for an automotive vehicle as claimed in claim 30, wherein said front end section of the front bracket is mounted with a door mirror.

35. A structure of a body for an automotive vehicle as claimed in claim 30, wherein:
   said side door comprises a door panel of a double structure formed with an inner panel and an outer panel; and
   a portion of said door panel at which said front bracket is mounted is reinforced with a reinforcement member.

36. A structure of a body for an automotive vehicle as claimed in claim 35, wherein said front bracket is fixed to a merged section at which said reinforcement member is joined with said door panel.

37. A structure of a body for an automotive vehicle as claimed in claim 36, wherein:
   said inner panel and said outer panel are each provided with an upper flange section at which said inner panel and said outer panel are attached to each other; and
   said reinforcement member is joined each to said upper flange section for said inner panel and for said outer panel.

38. A structure of a body for an automotive vehicle as claimed in claim 37, wherein:
   said flange section for the inner panel is disposed in a relationship spaced apart in a direction of thickness of the side door from said flange section for the outer panel in a position in which said rear bracket is mounted, said position being provided with a mounting section opening upwards;
   said rear bracket is fixed to said mounting section; and
   said reinforcement member is in a sectional shape having a pair of joint sections and a connection section, said joint section each being attached to the flange section of said mounting section at least for both of said inner panel and said outer panel, and said connection section connecting said joint sections to each other in a direction of thickness of the side door.

* * * * *